(12) United States Patent
Azami et al.

(10) Patent No.: US 11,509,586 B2
(45) Date of Patent: Nov. 22, 2022

(54) MANAGEMENT DEVICE, COMMUNICATION SYSTEM, AND NON-TRANSITORY COMPUTER-READABLE RECORDING MEDIUM

(71) Applicant: JVCKENWOOD Corporation, Yokohama (JP)

(72) Inventors: Tomohiro Azami, Yokohama (JP); Ichiro Shishido, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/140,264

(22) Filed: Jan. 4, 2021

(65) Prior Publication Data

US 2021/0218678 A1 Jul. 15, 2021

(30) Foreign Application Priority Data

Jan. 10, 2020 (JP) .............................. JP2020-002909

(51) Int. Cl.
| *H04L 47/24* | (2022.01) |
| *H04L 47/28* | (2022.01) |
| *G06N 3/04* | (2006.01) |
| *G06N 3/08* | (2006.01) |
| *H04L 43/08* | (2022.01) |
| *H04L 5/16* | (2006.01) |
| *H04L 43/0882* | (2022.01) |

(52) U.S. Cl.
CPC ............... *H04L 47/24* (2013.01); *G06N 3/04* (2013.01); *G06N 3/08* (2013.01); *H04L 5/16* (2013.01); *H04L 43/0882* (2013.01); *H04L 47/28* (2013.01)

(58) Field of Classification Search
None
See application file for complete search history.

(56) References Cited

U.S. PATENT DOCUMENTS

| 2016/0330622 A1* | 11/2016 | Yaginuma ............. H04W 12/06 |
| 2017/0280376 A1* | 9/2017 | Nagahama ............ H04W 48/06 |
| 2019/0007857 A1* | 1/2019 | Shimoshimano ... H04W 74/006 |

FOREIGN PATENT DOCUMENTS

JP 02-202731 8/1990

* cited by examiner

*Primary Examiner* — Yemane Mesfin
*Assistant Examiner* — Jeff Banthrongsack
(74) *Attorney, Agent, or Firm* — Amin, Turocy & Watson, LLP

(57) ABSTRACT

A management device includes an obtaining unit that obtains the attribute data of at least a communication performed among terminal devices in a communication system; a determining unit that performs a predetermined determination operation based on the attribute data obtained by the obtaining unit, and outputs the likelihood of the communication being followed by other communication relevant to the communication; and a communication control unit that, based on the output of the determining unit, controls the period of time during which the terminal devices involved in the communication are able to use the line of the communication system on a priority basis.

8 Claims, 8 Drawing Sheets

FIG.3

| CALL ID | CALL START DATE/TIME | CALL END DATE/TIME | CALL CH | SOURCE ID | DESTINATION GROUP ID | DESTINATION INDIVIDUAL ID |
|---|---|---|---|---|---|---|
| 1 | 09/25/2019 15:51:23 | 09/25/2019 15:51:41 | 3 | 145 | 2 | 0 |
| 2 | 09/25/2019 15:51:33 | 09/25/2019 15:51:50 | 2 | 129 | 0 | 115 |
| 3 | 09/25/2019 15:51:46 | 09/25/2019 15:52:05 | 3 | 158 | 2 | 0 |
| 4 | 09/25/2019 15:51:52 | 09/25/2019 15:52:03 | 2 | 115 | 0 | 129 |
| 5 | 09/25/2019 15:52:23 | 09/25/2019 15:54:48 | 3 | 133 | 3 | 0 |
| 6 | 09/25/2019 15:55:00 | 09/25/2019 15:55:40 | 3 | 145 | 2 | 0 |
| 7 | 09/25/2019 15:56:00 | 09/25/2019 15:56:20 | 3 | 125 | 2 | 0 |
| ... | ... | ... | ... | ... | ... | ... |

FIG.4

| | LEARNING PARAMETER |
|---|---|
| INPUT PARAMETER | DESTINATION GROUP ID |
| | DESTINATION INDIVIDUAL ID |
| | CALLER ID |
| | SOURCE ID |
| | NUMBER OF IN-CONVERSATION CALLS TILL TARGET CALL |
| | NUMBER OF IN-CONVERSATION CALLS MADE BY CALLER TERMINAL DEVICE TILL TARGET CALL |
| | TRANSMISSION TIME |
| | TRANSMISSION TIME OF RECENT n NUMBER OF IN-CONVERSATION CALLS TILL TARGET CALL |
| | AVERAGE TRANSMISSION TIME OF IN-CONVERSATION CALLS TILL TARGET CALL |
| | LONGEST TRANSMISSION TIME OF IN-CONVERSATION CALLS TILL TARGET CALL |
| | TIMING OF CALL |
| | DAY OF CALL |
| | ... |
| OUTPUT PARAMETER | CONVERSATION END FLAG |

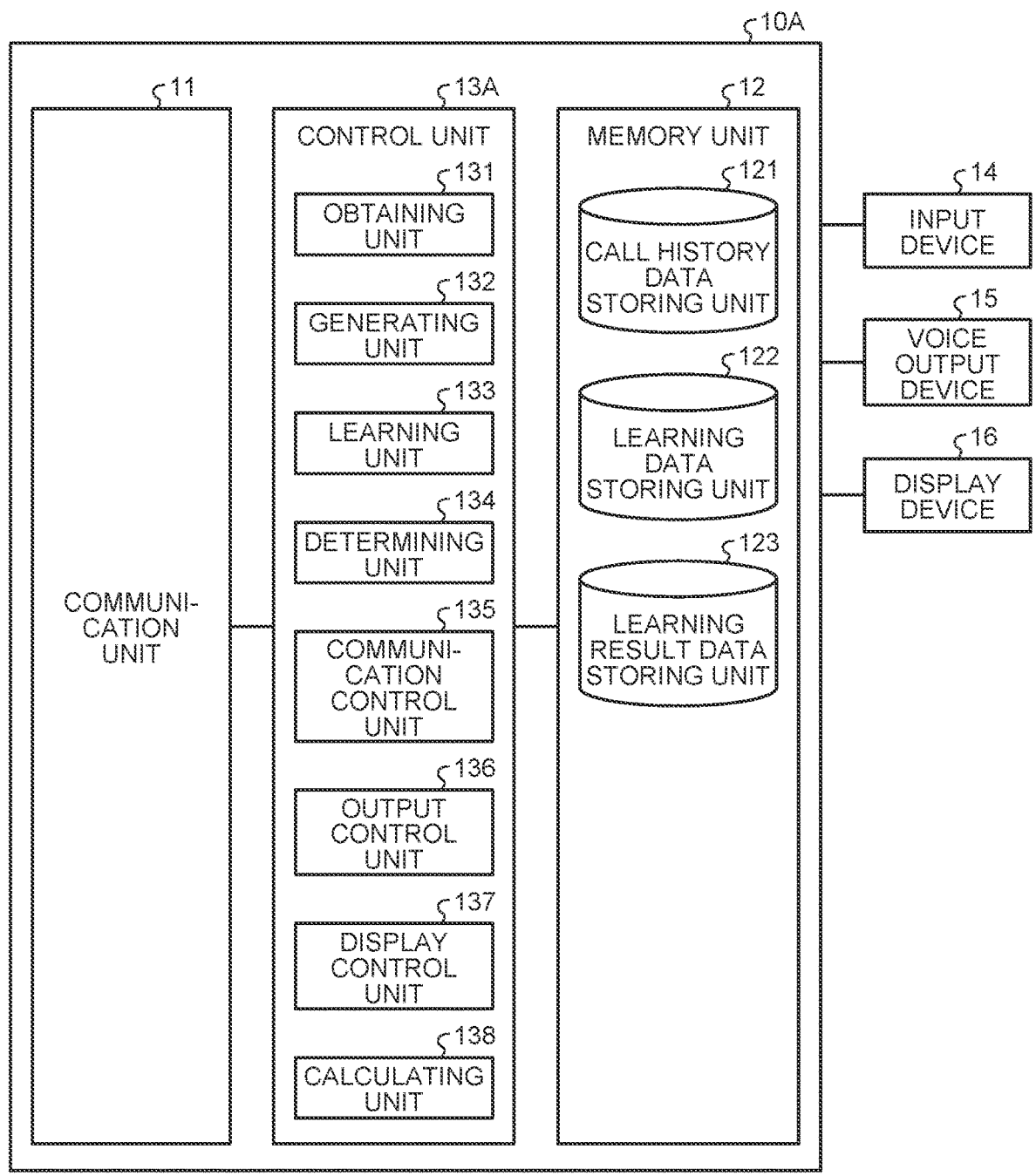

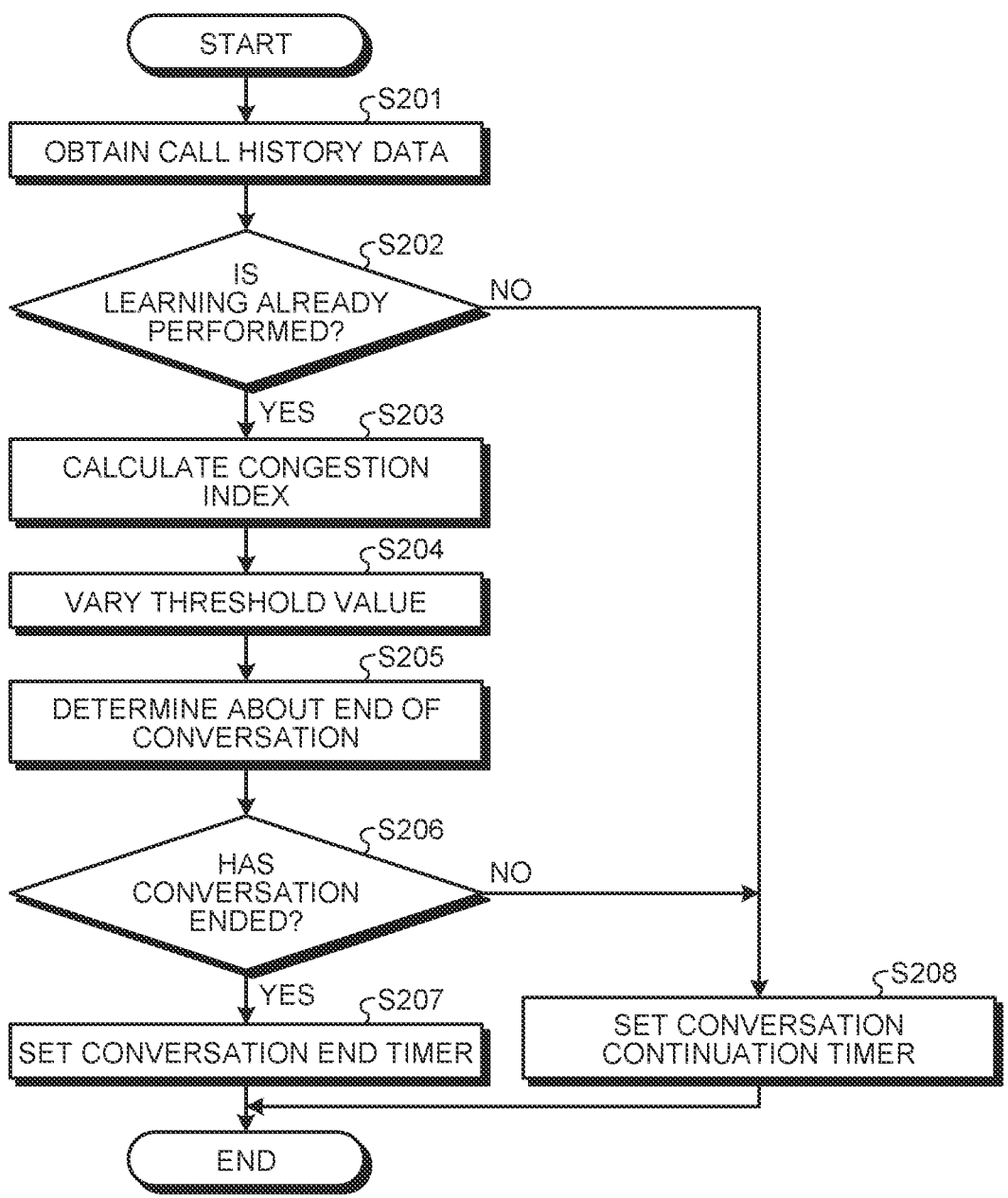

MANAGEMENT DEVICE, COMMUNICATION SYSTEM, AND NON-TRANSITORY COMPUTER-READABLE RECORDING MEDIUM

CROSS-REFERENCE TO RELATED APPLICATIONS

This application claims priority from Japanese Application No. 2020-002909, filed on Jan. 10, 2020, the contents of which are incorporated by reference herein in its entirety.

BACKGROUND

The present disclosure relates to a management device, a communication system, and a non-transitory computer-readable recording medium.

In regard to communication systems, a technique is known that mobile stations not involved in communication are prevented from cutting into the line.

For example, in JP H2-202731 A, a technique is disclosed in which a timer for a fixed period of time is set at the end of a call and the calling state is maintained during the activated state of the timer, so that mobile stations not involved in the original call are prevented from cutting into the line.

In JP H2-202731 A, since a timer is set for a fixed period of time, the line is occupied for a certain period of time even after the conversation is over. That leads to a decline in the usage efficiency of the line.

Particularly, when short conversations take place in a frequent manner, the line remains occupied irrespective of the fact that the conversations are over. That might lead to issues in the operation of the communication system.

SUMMARY

A management device according to an aspect of the present disclosure includes an obtaining unit, a determining unit, and a communication control unit. The obtaining unit is configured to obtain attribute data of at least a single communication performed among terminal devices in a communication system. The determining unit is configured to perform a predetermined determination operation based on the attribute data obtained by the obtaining unit, and output likelihood of the single communication being followed by other communication relevant to the single communication. The communication control unit is configured to, based on output of the determining unit, control a period of time during which terminal devices involved in the single communication are able to use a line of the communication system on a priority basis.

A communication system according an aspect of the present disclosure includes the management device according to an aspect of the present disclosure; and a plurality of terminal devices that performs communication.

A non-transitory computer-readable recording medium according to an aspect of the present disclosure contains a computer program. The computer program causes a computer to execute obtaining attribute data of at least a single communication performed among terminal devices in a communication system; determining that includes performing a predetermined determination operation based on the obtained attribute data, and outputting likelihood of the single communication being followed by other communication relevant to the single communication; and communication-controlling that, based on output of the determining, includes controlling a period of time during which terminal devices involved in the single communication are able to use a line of the communication system on a priority basis.

BRIEF DESCRIPTION OF THE DRAWINGS

FIG. 3 is a diagram illustrating an exemplary data structure of call history data;

FIG. 4 is a diagram illustrating an example of learning data;

FIG. 8 is a block diagram illustrating an exemplary configuration of a management device according to a second embodiment; and FIG. 9 is a flowchart for explaining a flow of a determination operation performed in the management device according to the second embodiment.

DETAILED DESCRIPTION

First Embodiment

Figure 1:
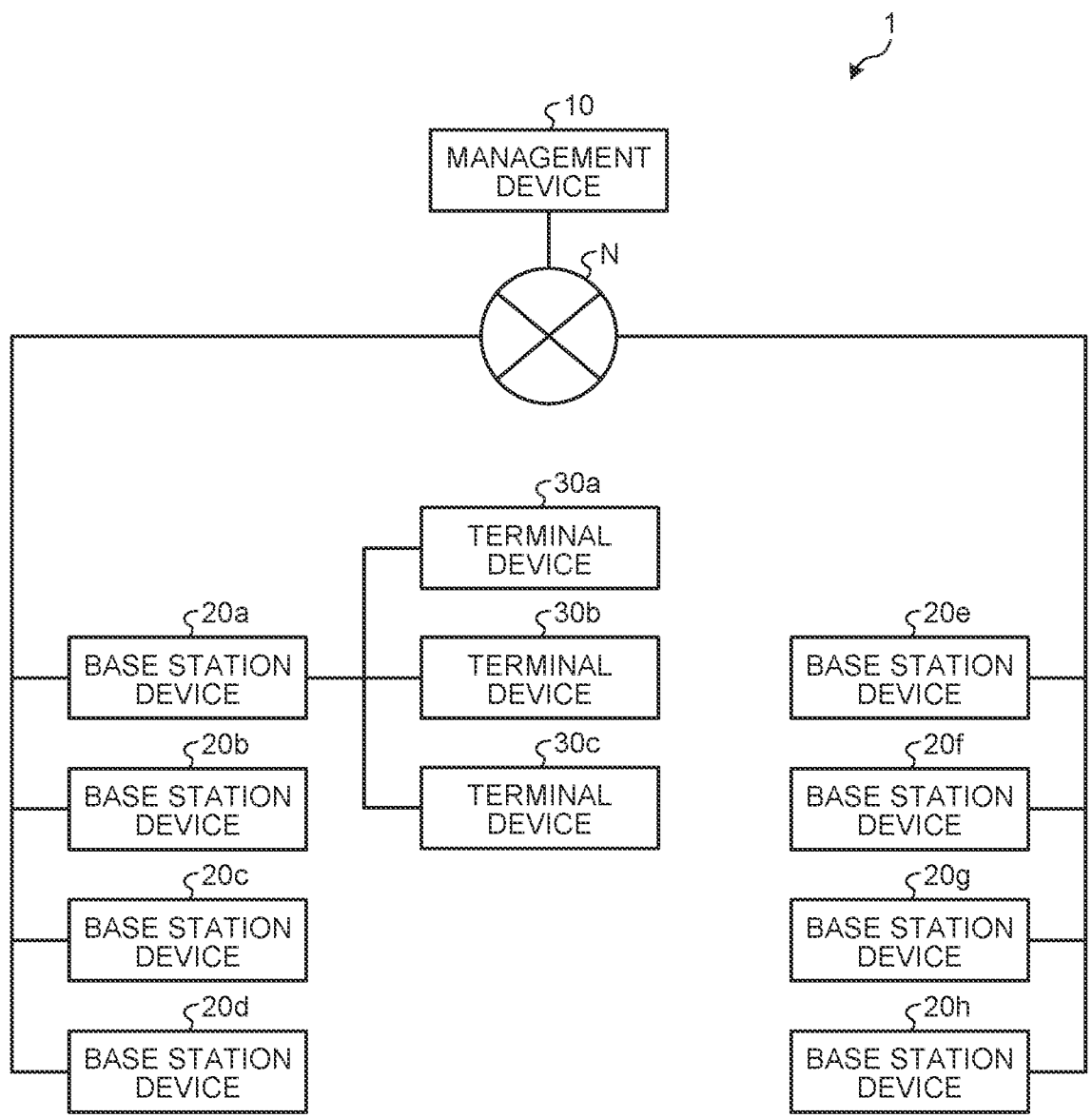
FIG. 1 is a diagram illustrating an exemplary configuration of a radio communication system according to embodiments.

Embodiments according to the present disclosure will be described below in detail with reference to the accompanying drawings. However, the present disclosure is not limited by the embodiments described below. Moreover, when a plurality of embodiments is present, it is also possible to have combinations of the embodiments. In the embodiments described below, identical constituent elements are referred to by the same reference numerals, and the explanation thereof is not given repeatedly.

Radio Communication System

Explained below with reference to FIG. 1 is a radio communication system according to the embodiments. FIG. 1 is a diagram illustrating an exemplary configuration of the radio communication system according to the embodiments.

As illustrated in FIG. 1, a radio communication system 1 includes a management device 10 and base station devices 20a to 20h. In the embodiments, the radio communication system 1 is, for example, a commercial radio communication system that performs half-duplex communication. In the following explanation, although the radio communication system 1 is assumed to be a radio communication system that performs half-duplex communication, the present disclosure is not limited to that case. Alternatively, the radio communication system 1 can be a radio communication system that performs full-duplex communication. Moreover, in the embodiments, the explanation is given about an example of making calls (voice calls) in the radio communication system 1, it is also possible to perform data communication besides making calls.

The management device 10 is communicably connected to the base station devices 20a to 20h via a network N that is either of the wired type or of the wireless type. The management device 10 controls the base station devices 20a to 20h. The base station devices 20a to 20h are sometimes collectively referred to as base station devices 20. Moreover, the base station devices 20 are sometimes called "base stations". Each of the base station devices 20a to 20h has terminal devices 30a to 30c connected thereto, and communication is performed among the terminal devices 30a to 30c. However, in the example illustrated in FIG. 1, for the purpose of illustration, the terminal devices 30a to 30c are connected only to the base station device 20a. The terminal devices 30a to 30c are collectively referred to as terminal devices 30, and are sometimes simply called "terminals". The information about the terminal devices 30 that uses the base station devices 20 is registered in the base station devices 20 or in the management device 10. In the radio communication system 1, communication is performed among the terminal devices 30 registered in each base station. The number of base station devices 20 is not limited to eight as illustrated in FIG. 1, and there can be a greater number of base station devices 20 or a smaller number of base station devices 20. The same is the case regarding the number of terminal devices 30. Of course, it is possible that the terminal devices 30 are connected to (registered in) some other base station device 20 other than the base station device 20a. The number of terminal devices 30 registered in a single base station device 20 is arbitrary, and it is possible to have the base station devices 20 in which the terminal devices 30 are not registered.

In the present embodiment, for example, a single instance of communication from a terminal device A to a terminal device B is conveniently called a call. Moreover, in the communication among the users of terminal devices, the unit in which the relevant utterances (messages) are compiled is called a "conversation". Thus, a conversation is made of one or more relevant calls. Particularly, in the case of half-duplex communication, a conversation often includes a plurality of calls. For example, when a call (voice call) indicating "Please report the weather at your side." is made from the terminal device A to the terminal device B, the communication does not get concluded only with that single call. In response to that call, when at least a call indicating "The wind and rain has become stronger. Please send help immediately." is made from the terminal device B to the terminal device A, the communication gets concluded. Moreover, there can be times when a call indicating "Roger. Will send the help immediately." is made from the terminal A to the terminal B. In this example, a single conversation includes two or three calls. Of course, the number of calls constituting a conversation varies case by case. Thus, a single conversation may include only a single call. For example, with respect to a single call indicating "There is nothing particularly abnormal here. Ending the scheduled communication.", there may be no other relevant call. That is, a conversation is made of one or more calls having high semantic relevance. Besides half-duplex communication, in full-duplex communication too, a conversation is made of one or more calls. For example, assume that a user A makes a telephone call to a user B and decides on the time of meeting. After that call is ended, it is not rare that the user A again makes a telephone call to the user B and makes a supplementary statement or makes a correction to the earlier call by saying "Could you please postpone the time of meeting by 30 minutes?". In such a case too, two or more calls can be treated as a single conversation.

In a first embodiment, the management device 10 controls the radio communication system 1 based on the state of the conversation among the terminals in the radio communication system 1. Based on history data of the calls made among the terminal devices 30 of the radio communication system 1, the management device 10 determines the end of each conversation among the terminal devices 30. In the radio communication system 1, when either individual communication or group communication is performed, once it is determined that the conversation among the terminal devices 30 is over, the management device 10 sets a timer for holding the line (line state). Herein, individual communication implies the communication performed between two terminal devices 30, and group communication implies the communication performed with a group (a group of terminal devices 30) specified by the terminal device 30 that makes the call (i.e., specified by the caller terminal). Generally, group communication represents one-to-many communication performed among three or more terminals. When it is determined that a conversation is over, the management device 10 sets a conversation end timer and holds the line for a first predetermined time period. More particularly, during the first predetermined time period, the control is performed in such a way that only the terminals involved in the concerned call are able to use the channel that was used in the concerned call. For example, in the case of individual communication, only either one of the two terminals that were involved in the concerned call can make the next call using the same channel. In the case of group communication, only the terminals belonging to the group involved in the concerned call can make the next call using the same channel. The first predetermined time period is a relatively shorter period of time, and thus the conversation end timer is used to hold the line for a relatively shorter period of time (duration).

If it is determined that the conversation among the terminal devices 30 is still going on, the management device 10 sets a conversation continuation timer and holds the line for a second predetermined time period. The second predetermined time period is set for a longer period of time than the first predetermined time period. That is, the second predetermined time period is a relatively longer period of time, and thus the conversation continuation timer is used to maintain the line for a relatively longer period of time (duration). As a result, if it is determined that the conversation has ended, the management device 10 holds the line for a relatively shorter time period; and, if it is determined that the conversation is still going on, the management device 10 holds the line for a relatively longer time period. That enables achieving enhancement in the usage efficiency of the line as well as enables achieving user-friendliness. That is, if the conversation is more likely to continue, in order to ensure that the subsequent calls relevant to the earlier call are easily established, the line is secured (held) for a relatively longer period of time for the terminals involved in the call even after the call has ended. That enables achieving reduction in the possibility that the communication among the users is left unfinished. Thus, this operation can also be said to be the operation of enabling the terminals involved in the call to use the line on a priority basis. On the other hand, if the conversation is less likely to continue, then the line is thrown open to other terminals after the elapse of a relatively shorter period of time. That results in a higher usage efficiency of the line. The first predetermined time period can also be set to "0". That is, when it is determined that a conversation has ended, the line can be promptly thrown open without using the conversation end timer. Meanwhile, the conversation end timer is sometimes called a first timer, and the conversation continuation timer is sometimes called a second timer. The operation of using two types of timers and varying the period of time for securing (holding) the line represents the operation of varying the priority given to the terminal devices 30, which are involved in a particular call, for using the line. Hence, the operation can also be said to be the operation of controlling the extent (degree) of enabling the use of the line on a priority basis.

Management Device According to First Embodiment

Figure 2:
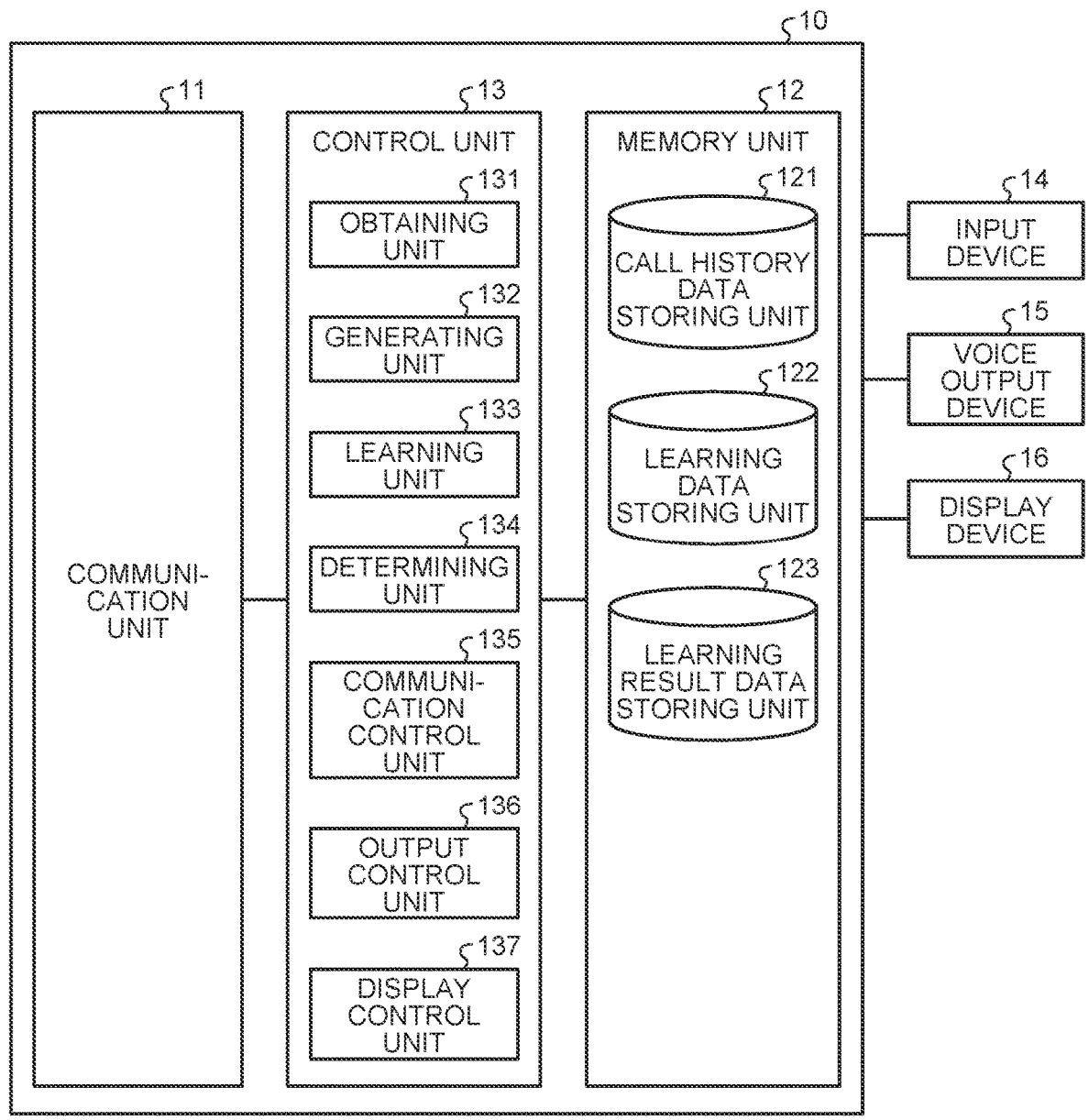
FIG. 2 is a block diagram illustrating an exemplary configuration of a management device according to a first embodiment.

Explained below with reference to FIG. 2 is a configuration of the management device according to the first embodiment. FIG. 2 is a block diagram illustrating an exemplary configuration of the management device according to the first embodiment.

As illustrated in FIG. 2, the management device 10 includes a communication unit 11, a memory unit 12, and a control unit 13. Moreover, to the management device 10 are connected an input device 14, a voice output device 15, and a display device 16.

The communication unit 11 can be implemented using, for example, a network interface card (NIC) or a communication circuit. The communication unit 11 is connected to a plurality of base station devices 20 via the network N. The communication unit 11 receives a variety of information from a plurality of base station devices 20 via the network N. For example, the communication unit 11 receives, from a plurality of base station devices 20, information related to the calls made among the terminal devices 30 of the radio communication system 1.

The memory unit 12 is implemented using, for example, a semiconductor memory device such as a random access memory (RAM) or a flash memory, or a memory device such as a hard disk or an optical disk. The memory unit 12 stores therein, for example, a variety of information. The memory unit 12 includes a call history data storing unit 121, a learning data storing unit 122, and a learning result data storing unit 123.

The call history data storing unit 121 stores therein call history data of the radio communication system 1. FIG. 3 is a diagram illustrating an exemplary data structure of the call history data. As illustrated in FIG. 3, the call history data includes the following items: "call ID", "call start date/time", "call end date/time", "call CH", "source ID", "destination group ID", and "destination individual ID".

The "call ID" represents identification information enabling identification of the call. The "call start date/time" represents the information about the timing at which the call was started. The "call end date/time" represents the information about the timing at which the call was ended. The "call CH" represents identification information enabling identification of the channel that was used in the call. The "source ID" represents identification information (terminal ID) enabling identification of the terminal device 30 that made the call. The "destination group ID" represents identification information enabling identification of the group involved in group communication. Thus, in the case of group communication, the "destination group ID" represents information enabling identification of the group. However, in the case of individual communication, the "destination group ID" indicates an invalid value such as "0". The "destination individual ID" represents identification information enabling identification of the terminal device 30 serving as the communication partner. Thus, in the case of individual communication, the "destination individual ID" represents information enabling identification of the terminal device 30 serving as the communication partner. However, in the case of group communication, the "destination individual ID" represents an invalid value such as "0". Such call history data is also called attribute data of the call (call attribute data) or call attribute information. The call attribute data does not contain the voice data of the call (i.e., does not contain the actual contents of the call).

The learning data storing unit 122 stores therein learning data that is generated by a generating unit 132 (described later) and that is used in the learning performed to control the radio communication system 1. More particularly, the learning data storing unit 122 stores therein learning data that is meant for learning a learning model (a classifier) used to estimate the end of a conversation. Explained below with reference to FIG. 4 is an example of the learning data. FIG. 4 is a diagram illustrating an example of the learning data. Illustrated in FIG. 4 is a list of learning parameters (feature quantities) constituting the learning data. The learning parameters include input parameters and output parameters.

Examples of the input parameters include the following items: "destination group ID", "destination individual ID", "caller ID", "source ID", "number of in-conversation calls till target call", "number of in-conversation calls made by caller terminal device 30 till target call", "transmission time", "transmission time of recent n number of in-conversation calls till target call", "average transmission time of in-conversation calls till target call", "longest transmission time of in-conversation call till target call", "timing of call", and "day of call". The generating unit 132 generates such input parameters based on the data stored in the call history data storing unit 121. All input parameters are generated based on the attribute information of the calls.

Regarding the "destination group ID" and the "destination individual ID", the explanation has been given earlier. The "caller ID" represents identification information enabling identification of the terminal device 30 that started the conversation, that is, made (sent) the initial call of a conversation. The start of a conversation is identified according to methods described later. The "source ID" represents identification information enabling identification of the terminal device 30 that made (sent) the target call for processing (the target call). In other words, the "source ID" represents identification information enabling identification of the terminal device 30 in which a PTT (Push to Talk) button for the target call is pushed. Meanwhile, calling, sending, as well as transmission has the same meaning of specifying the calling partner and starting a call. However, for convenience, the term "caller" indicating the terminal device 30 that makes the initial call of a conversation is used separately from the term "source" indicating the terminal ID that makes the target call (an arbitrary call during a conversation).

The "number of in-conversation calls till target call" represents the information related to the number of calls spanning from the initial call to the target call during a single conversation. In other words, the "number of in-conversation calls till target call" represents the information related to the number of times for which the PTT button is pressed from the initial call till the target call during a single conversation. The "number of in-conversation calls made by caller terminal device 30 till target call" represents identification information related to the number of calls, from among the calls spanning from the initial call till the target call during a single conversation, made by the caller terminal device 30 (i.e., the terminal device 30 that made the initial call of a conversation). In other words, the "number of in-conversation calls made by caller terminal device 30 till target call" represents the information related to the number of times for which the PTT button is pressed in the caller terminal device 30 (i.e., the terminal device 30 that made the initial call of a conversation) from the initial call till the target call during a single conversation.

The "transmission time" represents the information related to the calling duration of the target call. In other words, the "transmission time" represents the information related to the period of time for which the PTT button was pressed in the terminal device 30 that made the target call. The "transmission time of recent n number of in-conversation calls till target call" represents the information related to the total of the transmission time (the calling duration) of n number of calls (where n is a predetermined integer equal to or greater than two) when going backward in time from the target call. For example, when n=2 holds true and when it is assumed that three calls, namely, a call 1, a call 2, and a call 3 are made during a single conversation; at the point of time at which the call 3 is over, the "transmission time of recent n number of in-conversation calls till target call" represents the total of the transmission time of the call 2 and the call 3. In other words, the "transmission time of recent n number of in-conversation calls till target call" includes the information related to the total period of time for which the PTT button was pressed in the n number of calls when going backward in time from the target call. Either when only a single call is included in a conversation or at the point of time when only a single call is included in a conversation, the "transmission time of recent n number of in-conversation calls till target call" represents the information indicating "0" or "undefined". The "average transmission time of in-conversation calls till target call" represents the information related to the average calling duration of the calls spanning from the initial call till the target call in a single conversation. In other words, the "average transmission time of in-conversation calls till target call" represents the information related to the average period of time for which the PTT button was pressed in the calls spanning from the initial call till the target call in a single conversation. The "longest transmission time of in-conversation call till target call" represents the information related to the calling duration of the longest call from among the calls spanning from the initial call till the target call in a single conversation. In other words, the "longest transmission time of in-conversation call till target call" includes the information related to the longest period of time for which the PTT button was pressed from among the periods of time for which the PTT button was pressed in the calls spanning from the initial call till the target call in a single conversation.

The "timing of call" includes the information related to the timing at which the target call was made. More particularly, although the "timing of call" is the call start timing (the call start date/time), it can be an arbitrary timing between the start of the call to the end of the call. Moreover, instead of treating the precise timing (point of time) of making the call as the "timing of call", the time slot in which the call was made can be treated as the "timing of call". In the case of using the time slot, for example, the time slots can be segmented on an hourly basis or can be segmented after every arbitrary period of time (for example, three hours). The "day of call" represents the information related to the day of the week on which the target call was made.

Figure 5:
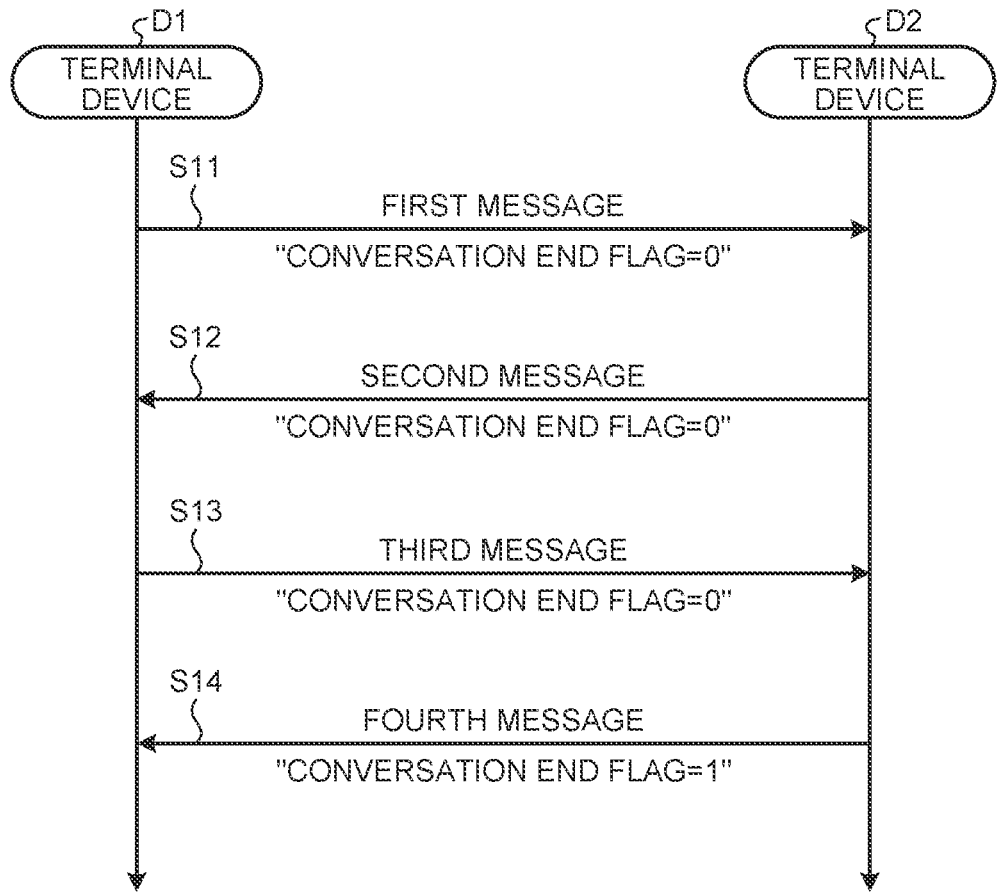
FIG. 5 is a diagram for explaining a conversation end flag.

The output parameters include a "conversation end flag". From among one or more successive calls of a conversation, the intermediate calls have the conversation end flag set to "0", and the last call of the conversation has the conversation end flag set to "1". FIG. 5 is a diagram for explaining the conversation end flag. In FIG. 5 is also illustrated the relationship between the messages (for example, the calls), which are communicated among terminal devices, and the conversation.

In FIG. 5, an example is illustrated in which two terminal devices, namely, a terminal device D1 and a terminal device D2 perform voice communication using half-duplex communication. The terminal device D1 sends a first message (a first call) to the terminal device D2 (Step S11). The first message indicates "Please tell about the situation there". In that case, since the conversation is going on, the conversation end flag is set to "0".

The terminal device D2 sends a second message (a second call) to the terminal device D1 (Step S12). The second message indicates "There is traffic jam. Could you wait for another 30 minutes?". In that case, since the conversation is going on, the conversation end flag is set to "0".

The terminal device D1 sends a third message (a third call) to the terminal device D2 (Step S13). The third message indicates "Ok. I will delay the start of the event by 30 minutes.". In that case, since the conversation is going on, the conversation end flag is set to "0".

The terminal device D2 sends a fourth message to the terminal device D1 (Step S14). The fourth message indicates "Thank you.". In that case, since the conversation is over, the conversation end flag is set to That is, in the example illustrated in FIG. 5, a single conversation is made of four messages (for example, four calls).

Returning to the explanation with reference to FIG. 2, the learning result data storing unit 123 stores therein learning result data that is learnt using the learning data. In other words, the learning result data storing unit 123 stores therein an already-learnt model. The learning result data is used in predicting various operations in the radio communication system 1. More particularly, the learning result data is used in predicting (determining) the end of a conversation made among the terminal devices 30.

The control unit 13 is implemented when, for example, a central processing unit (CPU) or a micro processing unit (MPU) executes programs, which are stored in the management device 10, using a random access memory (RAM) as the work area. The control unit 13 is a controller and can be implemented using, for example, an integrated circuit such as an application specific integrated circuit (ASIC) or a field programmable gate array (FPGA). The control unit 13 can implemented using software, or using hardware, or using a combination of software and hardware. The control unit 13 includes an obtaining unit 131, the generating unit 132, a learning unit 133, a determining unit 134, a communication control unit 135, an output control unit 136, and a display control unit 137.

The obtaining unit 131 obtains a variety of information. The obtaining unit 131 obtains the information that is received by the communication unit 11 and that is related to the calls made among the terminal devices 30. Then, the obtaining unit 131 stores the obtained information related to the calls made among the terminal devices 30 as the call history data in the call history data storing unit 121 of the memory unit 12.

The generating unit 132 generates a variety of information. The generating unit 132 generates learning data. Herein, the generating unit 132 generates learning data based on the call history data stored in the call history data storing unit 121. More particularly, the generating unit 132 extracts predetermined items from the call history data stored in the call history data storing unit 121, and generates learning data. The generating unit 132 generates the conversation end flag as the learning data based on the call history data. Then, the generating unit 132 stores the generated learning data in the learning data storing unit 122. For example, on a periodic basis such as once a day, the generating unit 132 generates learning data from the call history data and stores the learning data in the learning data storing unit 122.

The display control unit 137 displays a variety of information in the display device 16. For example, the display control unit 137 displays the information related to the call history in the display device 16.

The input device 14 receives various operations from the user (the administrator). For example, the input device 14 receives operations for controlling the base station devices 20 that are connected to the management device 10. As the input device 14, at least one of a computer keyboard, a mouse, buttons, switches, and a touch-sensitive panel can be used. For example, the input device 14 can receive the utterances of the user as the input. In that case, the input device 14 can be configured with a voice input device such as a microphone.

The display device 16 displays a variety of information. For example, the display device 16 displays the information related to the history of the calls made in the radio communication system 1. For example, the display device 16 is configured with a liquid crystal display (LCD) or an organic electro-luminescence (organic EL) display.

The output control unit 136 outputs voices from the voice output device 15. For example, in a second method and a third method for generating the conversation end flag as described later, the output control unit 136 reads the voices of predetermined calls from the memory unit 12 in response to an operation input in the input device 14, and outputs the voices from the voice output device 15.

The voice output device 15 outputs voices. The voice output device 15 outputs the voices of the calls made among the terminal devices 30 of the radio communication system 1. The voice output device 15 either can output the calls of the terminal devices 30 of the radio communication system 1 in real time or can output the voices of the recorded calls of the past. The user (the administrator) can listen to the voices output from the voice output device 15, and can confirm the voices of the calls. The voice output device 15 is configured with a speaker.

Conversation End Flag

Given below is the explanation of the methods by which the generating unit 132 generates the conversation end flag representing the output parameter.

First Method for Generating Conversation End Flag

Based on the call history data stored in the call history data storing unit 121, the generating unit 132 extracts all calls that satisfy a predetermined first condition from the call history having the call end time to be prior to the current time than a predetermined period of time (for example, one minute) or more. The first condition includes three conditions (conditions A to C). The condition A indicates that the calls are made in the same communication CH. The condition B indicates that the group destination ID is the same in the case of group communication. The condition C indicates that the combination of the source ID and the destination individual ID is the same in the case of individual communication. In the case of the condition C, even when the source and the destination (the transmission destination) are reversed, it is assumed that the combination remains the same. In the case of group communication, data satisfying the conditions A and B is extracted. In the case of individual communication, data satisfying the conditions A and C is extracted. For example, in the example illustrated in FIG. 3, regarding the calls having the communication CH "3" as the condition A and having the destination group ID "2" as the condition B, the generating unit 132 extracts the call IDs "1", "3", "6", and "7".

Then, the generating unit 132 determines, in ascending order of the call start date/time, whether the extracted calls satisfy the second condition. Herein, the second condition indicates that the interval between two calls (the former call and the latter call) is equal to or shorter than a predetermined period of time. For example, assume that the time difference between the end time of the former call and the start time of the latter call is equal to or shorter than a predetermined value (for example, 30 seconds). However, the second condition is not limited to this condition, and some other condition can alternatively be set. In the following explanation, although the predetermined value is set to "30 seconds", that is not the only possible case. The predetermined value can be arbitrarily set by the user of the management device 10. If it is determined that the extracted calls satisfy the second condition, then the generating unit 132 sets the conversation end flag to "0" for the former call (the target call for processing). On the other hand, if it is determined that the extracted calls do not satisfy the second condition, then the generating unit 132 sets the conversation end flag to "1" for the former call (the target call for processing). Of course, also in the case in which no call is made after the target call for processing, the generating unit 132 sets the conversation end flag to "1". Moreover, the generating unit 132 identifies, as the initial call of the conversation, the initial call extracted according to the first condition and the call immediately after (subsequent to) the call having the conversation end flag set to "1". For example, the "number of in-conversation calls till target call" is calculated by counting the number of calls spanning from the initial call, which is identified in the manner explained above, till the target call of the conversation.

For example, in the example illustrated in FIG. 3, the call end time "09/25/2019 15:51:41" corresponding to the call ID "1" and the call end time "09/25/2019 15:51:46" corresponding to the call ID "3" have the time difference of "5 seconds" therebetween. Hence, the generating unit 132 determines that the second condition is satisfied, and sets the conversation end flag to "0" for the call ID "1". Moreover, the call end time "09/25/2019 15:52:05" corresponding to the call ID "3" and the call end time "09/25/2019 15:55:00" corresponding to the call ID "6" have the time difference of "2 minutes 55 seconds" therebetween. Hence, the generating unit 132 determines that the second condition is not satisfied, and sets the conversation end flag to "1" for the call ID "3". Furthermore, the call end time "09/25/2019 15:55:40" corresponding to the call ID "6" and the call end time "09/25/2019 15:56:00" corresponding to the call ID "7" have the time difference of "20 seconds" therebetween. Hence, the generating unit 132 determines that the second condition is satisfied, and sets the conversation end flag to "0" for the call ID "6". Moreover, after the call ID "7", since there is no call satisfying the first condition, the generating unit 132 sets the conversation end flag to "1" for the call ID "7".

According to the first method for generating the conversation end flag, the learning data can be easily created without causing any burden on the administrator of the radio communication system 1.

Second Method for Generating Conversation End Flag

Given below is the explanation of the second method for generating the conversation end flag.

In the second method for generating the conversation end flag, the administrator (operator) of the radio communication system 1 listens to the calls meant for learning, and manually sets the conversation end flag. As the calls meant for learning, for example, it is possible to use the calls, from among the calls made in the past, for which an agreement is gained from the persons involved in the conversation. In that case, recorded data of the calls for which an agreement is gained can be prepared and stored in the memory unit 12.

In the second method for generating the conversation end flag, the administrator of the radio communication system 1 inputs, via the input device 14, an instruction for reproducing the recorded data in chronological order. In response to the instruction from the input device 14, the output control unit 136 of the control unit 13 reads the recorded data from the memory unit 12 and outputs the call voices from the voice output device 15. The administrator of the radio communication system 1 listens to the call voices output from the voice output device 15 and determines whether the conversation is still going on; and sets the conversation end flag on a call-by-call basis via the input device 14.

According to the second method for generating the conversation end flag, the administrator of the radio communication system 1 actually listens to call voices and manually sets the conversation end flag on a call-by-call basis. That enables achieving enhancement in the accuracy (precision) of the learning data.

Third Method for Generating Conversation End Flag

Given below is the explanation the third method for generating the conversation end flag.

In the third method for generating the conversation end flag, the first method and the second method are combined. More particularly, regarding the second condition according to the first method, two predetermined values, namely, a first predetermined value and a second predetermined value are kept ready. The second predetermined value is greater than the first predetermined value. For example, if the first predetermined value is set to 10 seconds, the second predetermined value is set to 1 minute. However, that is not the only possible case. Alternatively, the first predetermined value and the second predetermined value can be set to arbitrary values.

In an identical manner to the first method, regarding the call which satisfies the first condition and for which the call end time is separated from the call start time of the next call by a time difference shorter than the first predetermined value, the generating unit 132 sets the conversation end flag to "0". On the other hand, regarding the call which satisfies the first condition and for which the call end time is separated from the call start time of the next call by a time difference equal to or longer than the second predetermined value, the generating unit 132 sets the conversation end flag to "1". Furthermore, regarding two temporally adjacent calls having the time difference to be equal to or longer than the first predetermined value but shorter than the second predetermined value, the generating unit 132 sets a confirmation-required flag. The administrator of the radio communication system 1 listens to the calls for which the confirmation-required flag is set and sets the conversation end flag. That is, according to the third method, regarding the calls for which it is relatively difficult for the generating unit 132 to automatically set the conversation end flag, the administrator of the radio communication system 1 listens to those calls and sets the conversation end flag.

In the third method for generating the conversation end flag, it becomes possible to reduce the burden on the administrator of the radio communication system 1 as well as to enhance the accuracy of the learning data.

The learning unit 133 performs machine learning based on the learning data and generates learning result data, that is, generates a learning model. Then, the learning unit 133 stores the generated learning result data in the learning result data storing unit 123 of the memory unit 12. In the first embodiment, a neural network is used as the learning model (classifier). However, that is not the only possible case. Alternatively, for example, the learning unit 133 can use the learning model such as a decision tree and a support vector machine (SVM). Herein, the learning unit 133 can use various learning models of the linear type or the nonlinear type. Similarly to the generation of the learning data, the learning result data can be generated on a periodic basis, such as once a day. The learning result data can be generated immediately after generating the learning data (i.e., in a synchronized manner with the generation of the learning data), or can be generated in an asynchronous manner with the generation of the learning data.

Figure 6:
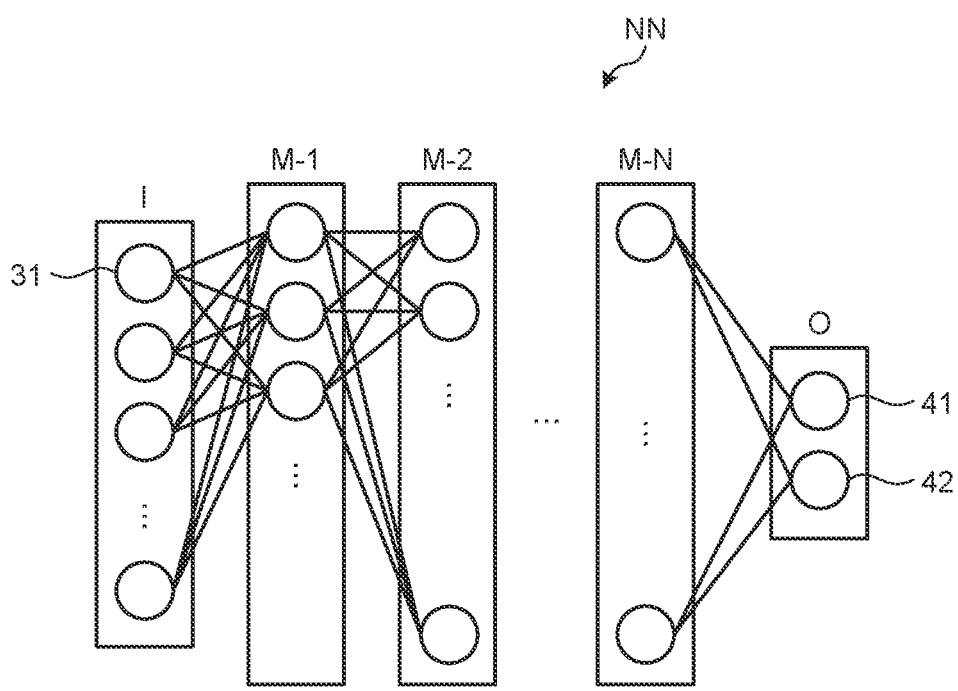
FIG. 6 is a diagram illustrating an exemplary configuration of a neural network.

Explained below with reference to FIG. 6 is a configuration of a neural network. FIG. 6 is a diagram illustrating an exemplary configuration of the neural network.

As illustrated in FIG. 6, a neural network NN includes an input layer I, an intermediate layer M-1, an intermediate layer M-2, . . . , an intermediate layer M-N (where N is an arbitrary integer), and an output layer O. That is, the neural network NN includes a single input layer, N number of intermediate layers, and a single output layer.

The input layer I includes a plurality of input cells 31 corresponding to the input parameters used in the learning data. For example, when 12 types of input parameters are used, the input layer I includes 12 input cells 31. Alternatively, the input layer I can include a plurality of input cells 31 with respect to a single input parameter. For example, when the day of the week is used as an input parameter, the input layer I can include seven input cells 31 corresponding to the days from Monday to Sunday. In the input layer I, the input parameters of the target call for processing are input. As explained above, all input parameters are generated based on the attribute data of a call. Thus, the input parameters can also be said to be attribute data of a call.

The number of intermediate layers from the intermediate layer M-1 to the intermediate layer M-N is arbitrary. Thus, there can be only one intermediate layer, or there can be a plurality of intermediate layers. Moreover, there can be an arbitrary number of cells in each intermediate layer from the intermediate layer M-1 to the intermediate layer M-N.

The output layer O includes output cells 41 and 42. The output cell 41 is a cell corresponding to conversation continuation (the conversation end flag "0"). The output cell 42 is a cell corresponding to conversation end (the conversation end flag "1"). In other words, the output cell 41 corresponds to the state in which the target call for processing is more likely followed by a subsequent relevant call. The output cell 42 corresponds to the state in which the target call for processing is less likely followed by a subsequent relevant call.

At the time of learning the neural network NN (i.e., during learning), regarding the call data having the conversation end flag set to "0", the learning unit 133 performs learning by setting a value of the output cell 41 to "1" and setting a value of the output cell 42 to "0". Moreover, during learning, regarding the call data having the conversation end flag set to "1", the learning unit 133 performs learning by setting a value of the output cell 41 to "0" and setting a value of the output cell 42 to "1".

In the neural network NN, there can be only one output cell in the output layer O. In that case, during learning, regarding the call data having the conversation end flag set to "0", the learning unit 133 performs learning by setting a value of the output cell to "0". Moreover, regarding the call data having the conversation end flag set to "1", the learning unit 133 performs learning by setting a value of the output cell to "1".

The learning unit 133 stores the model information of the learnt neural network (i.e., stores an already-learnt model) in the learning result data storing unit 123. More particularly, in the learning result data storing unit 123, the following information is stored as the model information: the number of cells in each layer of the neural network; the connection information among the cells; the weight coefficients of the inter-cell connections; and the characteristics of the activation functions of the cells.

Returning to the explanation with reference to FIG. 2, the determining unit 134 performs a predetermined determination operation. More particularly, the determining unit 134 performs a predetermined determination operation using the learning result data stored in the learning result data storing unit 123. For example, using the learning result data, the determining unit 134 determines whether a conversation among the terminal devices 30 has ended or would continue. For example, after a particular call among the terminal devices 30 has ended, the determining unit 134 outputs (determines), using the learning result data, the likelihood (the degree of likelihood) of a subsequent relevant call among the terminal devices 30 involved in the concerned call (i.e., the same combination of terminal devices 30). Since the learning result data is generated based on the attribute data of the other calls made before the target call for processing (i.e., based on the attribute data of the past calls), it can be said that the determining unit 134 performs the predetermined determination operation based on the attribute data of the target call for processing and the attribute data of the other calls, and outputs the likelihood of a subsequent relevant call.

More particularly, the determining unit 134 inputs, in the input layer I of the neural network NN, data related to the to-be-predicted conversation among the terminal devices 30 and, based on the output from the output cells 41 and 42, determines whether the conversation would continue. For example, if the output value of the output cell 41 is greater than the output value of the output cell 42, then the determining unit 134 determines that the conversation would continue. On the other hand, for example, if the output value of the output cell 41 is equal to or smaller than the output value of the output cell 42, then the determining unit 134 determines that the conversation would end. In other words, the determining unit 134 calculates the output difference value by subtracting the output value of the output cell 41 from the output value of the output cell 42 and, depending on whether the output difference value is equal to or greater than zero, determines whether the conversation would end. In other words, if the output difference value is equal to or greater than zero, then the determining unit 134 determines that the target call for processing is less likely to be followed by a subsequent relevant call. On the other hand, if the output difference value is smaller than zero, then the determining unit 134 determines that the target call for processing is more likely to be followed by a subsequent relevant call.

When there is only one output cell, the determining unit 134 compares the output from the output cell with a predetermined threshold value (for example, "0.5"), and determines whether the conversation would end or would continue. For example, if the output of the output cell is smaller than the threshold value, then the determining unit 134 determines that the conversation would continue. On the other hand, if the output of the output cell is equal to or greater than the threshold value, then the determining unit 134 determines that the conversation would end. In other words, if the output of the output cell is smaller than the threshold value, then the determining unit 134 determines that the target call for processing is more likely to be followed by a subsequent relevant call. On the other hand, if the output of the output cell is equal to or greater than the threshold value, then the determining unit 134 determines that the target call for processing is less likely to be followed by a subsequent relevant call.

The communication control unit 135 controls a variety of communication. The communication control unit 135 controls the state of the line after the end of a call. For example, if the determining unit 134 determines that the conversation would end, then the communication control unit 135 sets the conversation end timer and holds the line for a relatively shorter period of time for the terminals involved in the conversation. Herein, the conversation end timer is set for a relatively shorter period of time. For example, the setting period for the conversation end timer can be 0 seconds or 1 second. However, the setting period of the conversation end timer is not limited to those examples. For example, if the determining unit 134 determines that the conversation would continue, then the communication control unit 135 sets the conversation continuation timer and holds the line for a relatively longer period of time for the terminals involved in the conversation. Herein, the conversation continuation timer is set for a relatively longer period of time. For example, the setting period for the conversation continuation timer can be 5 seconds or 10 seconds. However, the setting period of the conversation continuation timer is not limited to those examples.

Operations of Management Device

Figure 7:
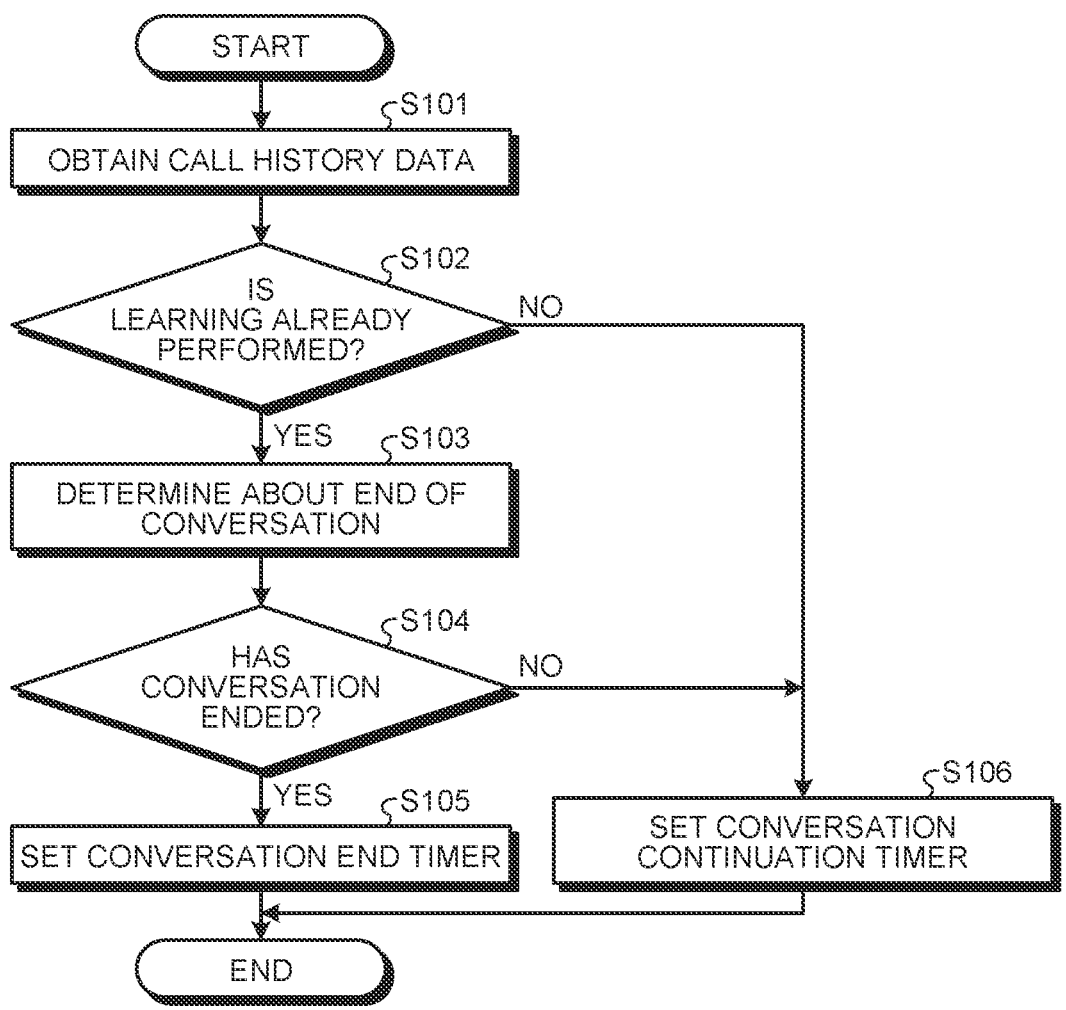
FIG. 7 is a flowchart for explaining a flow of a determination operation performed in a management device according to the first embodiment.

Explained below with reference to FIG. 7 is a determination operation performed in the management device according to the first embodiment. FIG. 7 is a flowchart for explaining a flow of the determination operation performed in the management device according to the first embodiment.

The management device 10 obtains the call history data (Step S101). More particularly, at the end of a call among the terminal devices 30 (also called the target call for processing, or the target call, or a call), the obtaining unit 131 obtains the call history data of the target call for processing from the base station device 20 via the communication unit 11, and additionally stores it as new call history data in the call history data storing unit 121. Then, the system control proceeds to Step S102.

The management device 10 determines whether the machine learning is already performed (Step S102). More particularly, the determining unit 134 determines whether an already-learnt model is stored in the learning result data storing unit 123. If it is determined that the machine learning is already performed (Yes at Step S102), then the system control proceeds to Step S103. On the other hand, if it is determined that the machine learning is not yet performed (No at Step S102), then the system control proceeds to Step S106.

When the determination indicates Yes at Step S102, the management device 10 determines whether the target call for processing represents the end of the conversation (Step S103). More particularly, firstly, the generating unit 132 reads the necessary data from the call history data storing unit 121, and generates input parameters of the target call for processing using the learning data generation method explained earlier. Herein, the necessary data implies the call history data (the attribute data) of each call spanning from the initial call till the target call for processing of the conversation in which the target call for processing is included. Based on the information of the calls made before the target call for processing, the generating unit 132 identifies the start of the conversation (the initial call of the conversation) according to the method explained earlier. For example, when the third call from the start of the conversation represents the target call for processing, the call history data of the first to third calls is obtained. Alternatively, when the start of the conversation represents the target call for processing, the call history data of only the target call for processing is obtained. That is, as the necessary data in the determination operation, the call history data (the call attribute data) of at least the target call for processing (a call) is obtained. Meanwhile, in place of the generating unit 132, the determining unit 134 can also obtain the necessary data and generate the input parameters of the target call for processing. Then, based on the already-learnt model stored in the learning result data storing unit 123 as explained earlier, the determining unit 134 determines whether the conversation ends with the target call for processing. More particularly, the input parameters of the target call for processing are input in the input layer I of the already-learnt neural network NN and, based on the output value of the output layer O, it is determined whether that conversation ends with the target call for processing. In other words, it is determined whether the target call for processing is more likely to be followed by a subsequent relevant call. Then, the system control proceeds to Step S104.

If it is determined that the conversation would end (Yes at Step S104), then the system control proceeds to Step S105. That is, if it is determined that the target call for processing is less likely to be followed by a subsequent relevant call, then the system control proceeds to Step S105. On the other hand, if it is determined that the conversation would not end (No at Step S104), then the system control proceeds to Step S106. That is, if it is determined that the target call for processing is more likely to be followed by a subsequent relevant call, then the system control proceeds to Step S106.

If the determination indicates Yes at Step S104, then the management device 10 sets the conversation end timer (Step S105). More particularly, the communication control unit 135 sets the conversation end timer and holds the line for the first predetermined time period. During the first predetermined time period, the terminal devices 30 other than the terminal devices 30 involved in the target call for processing are not able to perform transmission (make a call). That marks the end of the operations illustrated in FIG. 7.

Meanwhile, if it is determined No at Step S102 or if it is determined No at Step S104, then the management device 10 sets the conversation continuation timer (Step S106). More particularly, the communication control unit 135 sets the conversation continuation timer and holds the line for the second predetermined time period. As explained earlier, the second predetermined time period is relatively longer than the first predetermined time period. During the second predetermined time period, the terminal devices 30 other than the terminal devices 30 involved in the target call for processing are not able to perform transmission (make a call). That marks the end of the operations illustrated in FIG. 7.

As explained above, in the first embodiment, it is determined whether a conversation among the terminal devices 30 has ended and, if it is determined that the conversation has ended, the line is thrown open within a relatively shorter period of time. In other words, the (degree of) likelihood of occurrence of another call related to the target call (a call) is determined and, if it is determined that the degree of likelihood is low, the line is thrown open within a relatively shorter period of time (duration). That enables prompt release of the calling state of the line that was used in the conversation, so that the other terminal devices 30 can promptly make calls. That enables achieving enhancement in the usage efficiency of the line. On the other hand, if it is determined that the conversation would continue, then the line is secured (held) for a relatively longer period of time (duration) for the terminal devices 30 involved in the target call. That is, the line is made available on a priority basis to the terminal devices 30 involved in the target call. That enables achieving reduction in the possibility that the communication among the users of the terminal devices 30 is left unfinished, and enables achieving enhancement in the user-friendliness.

In the first embodiment, without having to use the voice data of the calls, the end of a conversation can be determined by performing machine learning based on the attribute data of the calls. Thus, in the first embodiment, the end of a conversation can be determined without having to use the voice data of the calls. As a result, in the first embodiment, it becomes possible to protect the privacy of the users who make calls using the terminal devices 30. Moreover, also in the case in which the calls among the terminal devices 30 are encrypted and the management device 10 is not able to decrypt the voices in the calls, it still becomes possible to determine the end of the conversation.

Meanwhile, while actually operating the radio communication system 1, for example, it is possible to think of cases in which the conversation ends with a short reply such as "yes" or "roger". Moreover, depending on a particular time slot, a particular day of the week, or the source ID; it is possible to think that there is a smaller number of calls in a single conversation. In the first embodiment, in such cases, the trend of the calls is learnt by performing machine learning, and the end of the calls can be determined.

First Modification Example of First Embodiment

In the first embodiment, based on whether a conversation has ended, either the conversation end timer or the conversation continuation timer is set. However, the value of the timer is not limited to those examples. For example, the communication control unit 135 can set an arbitrary value between the maximum value (for example, 10 seconds) and the minimum value (for example, 0 seconds) for the timer.

Generally, the output value of the signal output from the output layer O of the neural network NN represents a continuous amount (a continuous value) from "0" to "1". As explained earlier, when the output layer is configured with a single output cell, the output from that output cell represents a continuous amount (a continuous value) from "0" to "1".

For example, the communication control unit 135 can set the setting period of the timer to a value that is in between the maximum value and the minimum value and that is proportional to the output value. In other words, the communication control unit 135 can calculate the setting period of the timer by performing linear interpolation between the maximum value and the minimum value. For example, assume that the timer has the minimum value set to 0 seconds and has the maximum value set to 10 seconds. Then, if the output value is equal to "0.5", then the communication control unit 135 can set the timer to 5 seconds; and, if the output value is equal to "1", then the communication control unit 135 can set the timer to 10 seconds. The communication control unit 135 can perform nonlinear interpolation between the minimum value and the maximum value using a predetermined nonlinear function such as the S-curve.

When the output layer O is configured with two cells, namely, the output cell 41 corresponding to the conversation continuation and the output cell 42 corresponding to the conversation end, the communication control unit 135 calculates the output difference value by subtracting the output value of the output cell 41 from the output value of the output cell 42. The output difference values is a value in the range from −1 to +1. When the output difference value is equal to −1, the probability of the conversation continuation becomes the highest. When the output difference value is equal to +1, the probability of the conversation end becomes the highest. Hence, when the output difference value is equal to −1, the communication control unit 135 can set the timer to the maximum value. On the other hand, when the output difference value is equal to +1, the communication control unit 135 can set the timer to the minimum value. In that case too, when the output difference value is in the range between −1 and +1, the communication control unit 135 can perform linear interpolation or nonlinear interpolation according to the output difference value, and can calculate the value of the timer to be set. In the first embodiment, the likelihood (the extent, the probability) of occurrence of another call related to the target call for processing is determined in two stages. In contrast, in the first modification example of the first embodiment, it can be said that the likelihood is determined in three or more stages or using the continuous amount.

As explained above, according to the first modification example, since the value of the timer can be set in detail, it becomes possible to reduce the unnecessary waiting time at the end of a conversation. Hence, in the first modification example, the operation efficiency of the radio communication system 1 can be further enhanced.

Second Modification Example of First Embodiment

In the first embodiment, the explanation is given with reference to a commercial radio communication system that performs half-duplex communication. However, the present disclosure is not limited to that example. Alternatively, for example, the terminal device 30 can be a smartphone installed with an application for functioning as a transceiver or a telephone. That is, the terminal device 30 can be a smartphone that functions as a transceiver or a telephone. A call made by a smartphone can be a half-duplex (unidirectional) call or can be a full-duplex (bidirectional) call. Moreover, a call made by a smartphone can be an individual call (a call between two persons) or can be a group call (a call among three or more persons).

The smartphones are communicably connected via, for example, a public line or a wireless LAN. Thus, a smartphone performs radio communication with other smartphones via a public line or a wireless LAN. In that case, the management device 10 according to the present disclosure can be connected to a base station device of the public line or to a base station of the wireless LAN.

In a second modification example of the first embodiment, the management device 10 collects the call history data of the radio communication calls made among smartphones via a public line or a wireless LAN. As a result, the management device 10 becomes able to control the radio communication calls made among smartphones via a public line or a wireless LAN.

Second Embodiment

Explained below with reference to FIG. 8 is a configuration of a management device according to a second embodiment. FIG. 8 is a block diagram illustrating an exemplary configuration of the management device according to the second embodiment.

As illustrated in FIG. 8, a management device 10A according to the second embodiment differs from the management device 10 according to the first embodiment in the way that a control unit 13A includes a calculating unit 138.

The calculating unit 138 calculates, based on the data obtained by the obtaining unit 131 from each base station, a congestion index indicating the congestion state of the radio communication system 1. More particularly, the congestion state indicates, for example, the number of terminals registered in a base station, the channel utilization ratio, and the busy count occurred in a base station (for example, the number of times for which the calling resulted in an error due to the channel deficit). The calculating unit 138 can calculate the congestion index either based on one type of data or based on a plurality of types of data. The value of the congestion index increases in proportion to the congestion in the radio communication system 1. For example, the calculating unit 138 calculates the congestion index in three stages of "high", "medium", and "low". Moreover, for example, the calculating unit 138 can calculate the congestion index as a discrete numerical value or a continuous numerical value from "0" to "1". In that case, when the congestion index is equal to "0", it implies that there is minimum congestion; and, when the congestion index is equal to "1", it implies that there is maximum congestion. For example, when the extent of congestion is "low", the congestion index can be calculated to be "0". When the extent of congestion is "medium", the congestion index can be calculated to be "0.5". When the extent of congestion is "high", the congestion index can be calculated to be "1".

Operations of Management Device

In the second embodiment, based on the output value of the neural network and based on the congestion index indicating the degree of congestion of the line, the management device 10A determines whether the conversation has ended. FIG. 9 is a flowchart for explaining a flow of a determination operation performed in the management device according to the second embodiment. The operations performed at Steps S201 and S202 are same as the operations performed at Steps S101 and S102 illustrated in FIG. 7 according to the first embodiment. Hence, that explanation is not given again.

At Step S203, the calculating unit 138 calculates the congestion index (Step S203). At Step S204, according to the congestion index, the determining unit 134 varies the threshold value meant for determining the end of the conversation (Step S204). For example, when the output layer O includes a single output cell, as explained earlier, when the output of the output cell is equal to or greater than the threshold value, it is determined that the conversation has ended; and, when the output of the output cell is smaller than the threshold value, it is determined that the conversation would continue. For example, when the congestion index is "high", the determining unit 134 sets the threshold value to "0.3". When the congestion index is "medium", the determining unit 134 sets the threshold value to "0.5". When the congestion index is "low", the determining unit 134 sets the threshold value to "0.7". That is, the determining unit 134 sets the threshold value in inverse proportion to the congestion of the line of the radio communication system 1, so that it becomes easier to determine the end of the conversation.

Meanwhile, when the output layer O includes two output cells, namely, the output cells 41 and 42, the determining unit 134 calculates the output difference value by subtracting the output value of the output cell 41 from the output value of the output cell 42, and sets the threshold value according to the congestion index. For example, when the congestion index is "high", the determining unit 134 sets the threshold value to "−0.3". When the congestion index is "medium", the determining unit 134 sets the threshold value to "0". When the congestion index is "low", the determining unit 134 sets the threshold value to "+0.3". As a result, higher the congestion index, the easier it becomes to determine the end of the conversation.

In the second embodiment, at Step S205, when the output difference value (in the case in which the output layer O includes two output cells) or the output value (in the case in which the output layer O includes one output cell) is equal to or greater than the threshold value, the determining unit 134 determines that the conversation has ended; and, when the output difference value or the output value is smaller than the threshold value, the determining unit 134 determines that the conversation would continue (Step S205). That is, in the second embodiment, higher the congestion in the radio communication system 1, the easier it becomes for the determining unit 134 to determine that the conversation has ended. Thus, higher the congestion in the radio communication system 1, the shorter is the time set for holding the line after the end of a call. That enables achieving a higher line usage efficiency, and enables the other terminal devices 30 to quickly start the communication. The operations explained above can be said to be the operations in which, at the time of congestion, the extent (degree) of letting the terminal devices 30 involved in a particular call use the line of the radio communication system 1 on a priority basis is held down as compared to the normal condition. After the operation at Step S205 is performed, the operations performed from Step S206 to Step S208 are same as the operations performed from Step S104 to Step S106 illustrated in FIG. 7. Hence, that explanation is not given again.

The communication control unit 135 can perform interpolation between the minimum value and the maximum value of the timer and can set the value of the timer in multiple stages. For example, the communication control unit 135 can set the timer using a function having different characteristics according to the value of the congestion index. More particularly, the communication control unit 135 can set the timer using a function having the characteristics by which the period of the timer can be easily set in inverse proportion to the congestion index.

As explained earlier, in the second embodiment, higher the congestion in the radio communication system 1, the easier it becomes to determine the end of the conversation and the higher becomes the likelihood of setting the timer for a short period. For that reason, in the second embodiment, the line can be held for only a shorter period of time, thereby enabling achieving enhancement in the usage efficiency of the line. As a result, in the second embodiment, at the end of a conversation, the waiting time for the other terminal devices 30 can be shortened.

Other Embodiments

In the first and second embodiments, the explanation is given about an example in which, depending on whether the conversation is determined to have ended, the timer is set to have a different period of time. However, the present disclosure is not limited to that example. The management device 10 can control the constituent elements of the radio communication system 1, and can enhance the usage efficiency and the user-friendliness of the radio communication system 1.

For example, in order to perform maintenance of the radio communication system, there are times when it becomes necessary to terminate the devices such as the base station devices 20 and the management device 10 (i.e., the target devices for termination). In such a case, depending on whether a conversation among the terminal devices 30 has ended, the timing for terminating the target devices for termination can be decided. More particularly, if it is determined that the conversation would continue even after the end of a call, the termination operation is not performed. However, if it is determined that the conversation has ended, the termination operation is performed. Conventionally, the termination operation is often started at a predetermined date and time. Hence, there are times when communication cannot be performed during a conversation. In contrast, as a result of determining the state of the conversation and then deciding the timing of the termination operation, it becomes possible to reduce the occurrences of the situation in which the communication cannot be performed during a conversation. In the situation in which the communication cannot be performed during a conversation, after the system is rebooted, the calls (messages) having the same contents are retransmitted, thereby resulting in a decline in the usage efficiency of the radio communication system. Hence, by preventing such a situation from occurring, it becomes possible to prevent a decline in the usage efficiency of the line of the radio communication system or the usage efficiency of the entire system. Meanwhile, the termination period (the termination duration) can be decided based on the call history data. For example, learning data can be generated based on the call history data, and a learning model can be built that enables outputting an appropriate termination period.

Meanwhile, the call voices can be output based on the conversation end flag generated according to the methods explained earlier. More particularly, in the management device 10 or in some other device, the voices of each call are recorded and the conversation end flag is assigned to each call. That is, information (a tag) is assigned that enables identification of the start and the end of the conversation. As a result, for the user of the management device 10 or for the users of the terminal devices 10, it becomes easier to perform cue reproduction of the first call of the conversation or to collectively reproduce one or more calls of the conversation. That enables the user to easily verify the call contents in the past, and it results in an enhancement in the user-friendliness.

Meanwhile, in the embodiments described above, the explanation is given with reference to a radio communication system. However, the present disclosure is not limited to be implemented in a radio communication system, and can be implemented in a wired communication system too. For example, in a wired communication system, whether a conversation has ended can be determined and accordingly a period of time can be set for securing (holding) the resources such as the lines used in the wired communication system. For example, in a wired telephone system, the likelihood of a subsequent relevant call to a particular call is determined, and accordingly the extent of securing (holding) the resources, such as the network band and the switching equipment, can be set.

Meanwhile, in the embodiments described above, the explanation is given with reference to a communication system that performs voice calls. However, it is also possible to have a communication system that performs video calls besides performing voice calls. Moreover, it is also possible to have a communication system that performs data communication of chats instead of performing calls. For example, in a chatting system in which text data and image data is exchanged, a single post (a single message) corresponds to a single call and one more messages that are semantically groupable correspond to a conversation. In such a chatting system, the likelihood of the end of a conversation is determined, that is, the likelihood of posting of subsequent messages is determined; and, accordingly, a period of time for securing (holding) the line of the communication system can be set. That is, a period of time can be set in which the terminals involved in the exchange of a single message in the chatting system can use the line of the communication system, that is, the resource of the communication system on a priority basis.

Meanwhile, in the embodiments described above, the explanation is given about an example in which the period of time for securing (holding) the line is set depending on whether the conversation has ended. However, that is not the only possible case. For example, in order to enable the terminals involved in a communication (a message) to promptly send the subsequent communication (the subsequent message), an operation can be performed for establishing the communication sessions at a faster rate than normal. For example, if it is determined to have a high likelihood of transmission of the subsequent message, the resources of the computer that performs the session establishment operation (such as the CPU power, the number of CPUs to be used, and the memory size) and the network resources (bands) required in the session establishment operation are made available in a greater number as compared to the case in which transmission of the subsequent message is less likely. That is, depending on the likelihood of transmission of the subsequent communication, it becomes possible to control (adjust) the extent of letting the terminal devices 30 involved in the earlier communication (a communication) to use the resources of the communication system on a priority basis.

According to the present disclosure, it becomes possible to enhance the usage efficiency of the line.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management device comprising:
a processor configured to
obtain first attribute data of a target call, which is a call to be processed, performed among terminal devices in a communication system, and second attribute data of each of one or more calls performed before the target call,
generate, based on the first and second attribute data, input parameters to be input to a classifier generated using a method of machine learning,
determine, based on whether an output value of the classifier obtained as a result of inputting the input parameters to the classifier is equal to or greater than a predetermined value, a degree of likelihood of occurrence of a subsequent call related to the target call, the subsequent call being made after the target call by the terminal devices that performed the target call, and when the degree of likelihood is determined to be low, hold a line of the communication system for a first period of time after end of the target call for the terminal devices that performed the target call, whereas when the degree of likelihood is determined to be high, hold the line of the communication system for a second period of time after end of the target call for the terminal devices that performed the target call, the second period of time being longer than the first period of time.

2. The management device according to claim 1, wherein
the communication system is a radio communication system including a base station device,
the line of the communication system includes a channel used by the base station device, and
the processor is further configured to perform control such that when the degree of likelihood of occurrence of the subsequent call is determined to be low, during the first period of time after end of the target call, only the terminal devices that performed the target call are able to use a channel that was used in the target call by the base station, whereas when the degree of likelihood is determined to be high, during the second period of time after end of the target call, only the terminal devices that performed the target call are able to use the channel that was used in the target call by the base station.

3. The management device according to claim 1, wherein
the first and second attribute data each includes a call start time, a call end time, identification information to identify a source terminal device, and identification information to identify a destination terminal device or a destination group, and
the processor is further configured to
identify, based on the second attribute data, a first call having no preceding call performed by same combination of terminal devices within a predetermined period of time before start of the first call, to generate leaning data including the input parameters and at least one output parameter that is used to train the classifier, wherein when a time difference between end time of the first call and start time of a second call performed subsequent to the first call by the terminal devices that performed the first call is equal to or shorter than a predetermined time, the output parameter for the first call is set to a first value, whereas when the time difference is longer than the predetermined time, the output parameter for the first call is set to a second value, the first value indicating that the subsequent call has occurred, and the second value indicating that the subsequent call has not occurred,
generate, as the classifier, neural networks based on the learning data using a method of machine learning, and
determine the degree of the likelihood of occurrence of the subsequent call using the neural networks.

4. The management device according to claim 1, wherein
the processor is further configured to
calculate a congestion index which indicates congestion state of the communication system,
when the output value of the classifier obtained as a result of inputting the input parameters to the classifier is equal to or greater than the predetermined value, determine that the degree of likelihood of occurrence of the subsequent call is low, whereas when the output value of the classifier is smaller than the predetermined value, determine that the degree of likelihood is high, the predetermined value being set smaller as the congestion index is higher.

5. A communication system comprising:
the management device according to claim 1; and
a plurality of terminal devices that performs communication.

6. A non-transitory computer-readable recording medium containing a computer program causing a computer to execute:
obtaining first attribute data of a target call, which is a call to be processed, performed among terminal devices in a communication system, and second attribute data of each of one or more calls performed before the target call,
generating, based on the first and second attribute data, input parameters to be input to a classifier generated using a method of machine learning,
determining, based on whether an output value of the classifier obtained as a result of inputting the input parameters to the classifier is equal to or greater than a predetermined value, a degree of likelihood of occurrence of a subsequent call related to the target call, the subsequent call being made after the target call by the terminal devices that performed the target call, and
when the degree of likelihood is determined to be low, holding a line of the communication system for a first period of time after end of the target call for the terminal devices that performed the target call, whereas when the degree of likelihood is determined to be high, holding the line of the communication system for a second period of time after end of the target call for the terminal devices that performed the target call, the second period of time being longer than the first period of time.

7. The management device according to claim 1, wherein
the first and second attribute data each including a call start time, a call end time, identification information to identify a source terminal device, and identification information to identify a destination terminal device or a destination group, and
the processor is further configured to
identify, among the target call and the one or more calls performed before the target call by the terminal devices that performed the target call, a certain call having no preceding call within a predetermined period of time before a call start time of the certain call,
calculate number of calls performed from the certain call to the target call, and
include the number of calls to the input parameters.

8. The management device according to claim 1, wherein
the classifier outputs the output value in three or more levels, and
the processor is further configured to, in accordance with the output value of the classifier in three or more levels, set a period of time to have three or more values for holding the line of the communication system after end of the target call for the terminal devices that performed the target call.

* * * * *